UNITED STATES PATENT OFFICE 2,364,852

PROCESS FOR ISOLATING THE LACTATION-PROMOTING HORMONE

Karl Junkmann, Berlin, and Rudolf Tschesche, Berlin-Wilmersdorf, Germany, assignors to Schering Corporation, Bloomfield, N. J., a corporation of New Jersey No Drawing. Application March 14, 1941, Serial No. 383,350. In Germany April 10, 1940

3 Claims. (Cl. 167—74)

This invention relates to hormones of the anterior lobe of the pituitary gland and more particularly to the hormone capable of promoting lactation, and to a method of isolating this hormone from materials containing the same, and is an improvement over that described in the copending application of Karl Junkmann, Serial Number 304,546.

In this copending application a process is described for separating the thyreotropic and the lactation-promoting hormones from starting material containing the same, comprising extracting the starting material with dilute aqueous acids to extract the thyreotropic hormone and isolating the lactation-promoting hormone from the extraction residue. The extraction of the thyreotropic hormone is preferably performed with acetic acid of 0.25–0.5% at a pH of 4–5.

Now we have found that the extraction of the lactation-promoting hormone from the extraction residue described in said copending application or from a starting material containing the same, may be performed in an especially advantageous manner if it is carried out by means of alkaline agents, to which suitable salts are added in a concentration at which the lactation-promoting hormone is just not yet precipitated, while impurities remain in the residue. From the extracts obtained, the lactation-promoting hormone is separated and isolated in a known manner, especially by addition of acids to a pH of 4.5 or below or by precipitation at the isoelectric point.

As especially suitable there has proved the addition of a saturated solution of sodium sulfate, but also other salts, readily soluble in water, may be applied with the same effect.

The following example illustrates the invention without, however, limiting the same to them.

Example 1 kg. of the extraction residue obtained according to the process of application Serial No. 304,546 by extraction of whole hypophysis from hogs by means of aqueous-ammoniacal methanol to free them from the hormones of the posterior lobe and by means of aqueous acetic acid to free them from the thyreotropic hormone, is dried by treating it with a mixture of alcohol-ether or with acetone. The dry residue is then mixed with 10 times its weight of water and by addition of a sodium hydroxide solution the pH of the mixture is brought to a pH of about 9.5–10. Then, while stirring 2.2 kg. of crystalline sodium sulfate are added and caused to dissolve, whereupon the pH of the mixture is again adjusted, if necessary. Thereafter the mixture is stirred or treated in a ball mill for 16 hours and centrifuged. The residue is mixed with 20 ls. of water, and the pH of the mixture adjusted to about 9.5–10. 4.4 kgs. of sodium sulfate are added and the whole is treated for 2 hours in a ball mill. The liquid obtained by centrifuging is combined with the first extract, whereby approximately 30 ls. of liquid are obtained. It contains for each kg. of the starting material about 100,000 units of lactation-promoting hormone.

This extract is mixed with acetic acid till maximum precipitation occurs; this takes place at a pH of about 3.9–4.5. An excess of acid is to be avoided. The mixture is allowed to stand in an ice box over night. Then it is centrifuged, the precipitate is mixed with 10 times its volume of alcohol, filtered by suction, washed finally with a mixture of 2 parts of alcohol and 1 part of ether, and then with ether and dried. Thus, 70 grs. are obtained containing 80,000 units of the lactation-promoting hormone.

If the process is performed without addition of sodium sulfate, only 20–22 ls. of extract are gained, which on precipitation with acetic acid yields, however, 520–540 grs. of a precipitate with 60,000 units of lactation-promoting hormone.

The unit of the lactation-promoting hormone is that quantity, which injected into pigeons of 250–350 grs. of weight in equal parts for 4 days in the breast muscle increases the weight of the entire crop from normally 9–10 grs. for each kg. of body weight to 12.3 grs., while the weight of the isolated crop gland is increased from normally 2.3 grs. to 4.8 grs. for each kg. of body weight, if the weighing is carried out 100 hours after the first injection.

On starting, for instance, from a dried powder of the anterior pituitary gland of beef previously treated with acetone without addition of a salt 280 grs. of a precipitate are obtained by means of acetic acid containing 35,000 units of the lactation-promoting hormone, while with addition of sodium sulfate 50 grs. of a precipitate are gained containing 42,000 units of said hormone.

When using in place of the starting material obtained according to the process of the application Serial No. 304,546 a dried powder of the whole hypophysis of hogs previously treated with acetone without extraction by means of aqueous-ammoniacal methanol the products obtained are partly contaminated by other hormones of the anterior lobe of the pituitary gland.

Of course, many changes and variations may be made in the reaction conditions, the means and methods employed, and the like by those skilled in the art without departing from the principles set forth herein and in the claims annexed hereto.

What we claim is:

1. Process for the manufacture of a strongly enriched preparation of the lactation-promoting hormone of the anterior pituitary gland which comprises treating anterior pituitary gland material from which non-lactogenic hormones have been removed, with an aqueous alkaline liquor having a pH of about 9.5-10, the quantity of liquor being about ten times that of the dry gland material by weight, adding about 2.2 kg. of crystalline sodium sulfate for each kilogram of moist gland material, agitating the mixture, separating the extract, and subsequently acidifying the extract to a pH of about 3.9-4.5 to precipitate the lactation-promoting hormone.

2. Process for the manufacture of a strongly enriched preparation of the lactation-promoting hormone of the anterior pituitary gland which comprises treating the whole hypophysis of an animal with an aqueous-ammoniacal alcohol to extract the hormones of the posterior lobe, treating the residue with aqueous acetic acid to extract the thyreotropic hormone, drying the moist residue, mixing the same with approximately ten times its weight of water, adding sodium hydroxide to a pH of about 9.5-10, adding to the solution about 2.2 kg. of crystalline sodium sulfate for each kilogram of said moist residue, agitating the mixture, separating the extract, and subsequently acidifying the same to a pH of about 3.9-4.5 to precipitate the lactation-promoting hormone.

3. Process for the isolation of the lactation-promoting hormone of the anterior pituitary gland, comprising extracting anterior pituitary gland-containing material with an aqueous alcohol under alkaline conditions to remove hormones of the posterior lobe, extracting the residue with a weakly acid solution to remove thyreotropic hormone component, mixing the residue with a sodium hydroxide solution at a pH of about 9.5, adding sodium sulfate to the solution until an approximately saturated solution is obtained, separating the extract from the residue, and thereafter precipitating the lactation-promoting hormone therefrom by acidifying the same.

KARL JUNKMANN.
RUDOLF TSCHESCHE.